United States Patent [19]

Fuerst

[11] Patent Number: 5,618,419

[45] Date of Patent: Apr. 8, 1997

[54] FILTER CARTRIDGE WITH BACK STRUCTURE DEFINING A WEIR

[75] Inventor: Charles O. Fuerst, Simi Valley, Calif.

[73] Assignee: Aquaria, Inc., Moorpark, Calif.

[21] Appl. No.: 248,052

[22] Filed: May 24, 1994

[51] Int. Cl.$^6$ .................................................. B01D 25/26
[52] U.S. Cl. ............................. 210/238; 55/484; 55/515; 210/169; 210/248; 210/284; 210/484
[58] Field of Search ............................... 119/259; 210/86, 210/169, 238, 248, 282, 433.1, 484, 485, 283, 284; 55/484, 515–519; 264/45.1

[56] References Cited

U.S. PATENT DOCUMENTS

| | | |
|---|---|---|
| 2,605,901 | 8/1952 | Morrison et al. . |
| 4,111,813 | 9/1978 | Preus ........................................ 210/282 |
| 4,392,953 | 7/1983 | Cornelius et al. ...................... 210/169 |
| 4,448,695 | 5/1984 | Gordon, Jr. et al. . |
| 4,483,769 | 11/1984 | Sherman ................................. 210/282 |
| 4,490,253 | 12/1984 | Tafara ..................................... 210/238 |
| 4,714,547 | 12/1987 | Willinger ............................... 210/484 |
| 4,783,258 | 11/1988 | Willinger et al. ...................... 210/169 |
| 4,880,549 | 11/1989 | Willinger et al. ...................... 210/169 |
| 5,002,660 | 3/1991 | Sherman et al. ....................... 210/169 |
| 5,053,125 | 10/1991 | Willinger et al. ...................... 210/169 |
| 5,062,950 | 11/1991 | Shieh ....................................... 210/86 |
| 5,169,520 | 12/1992 | Wang ...................................... 210/169 |
| 5,171,437 | 12/1992 | Fletcher ................................. 210/484 |
| 5,173,195 | 12/1992 | Wright et al. . |
| 5,236,582 | 8/1993 | Huang .................................... 210/282 |
| 5,246,571 | 9/1993 | Woltmann .............................. 210/86 |
| 5,316,670 | 5/1994 | Yao ......................................... 210/169 |

FOREIGN PATENT DOCUMENTS 2414941  9/1979  France .................................. 210/484

*Primary Examiner*—Joseph W. Drodge
*Attorney, Agent, or Firm*—Loeb & Loeb LLP

[57] ABSTRACT

A filter cartridge for use with liquids or gases which includes a back structure having a plurality of pockets formed in it and filtration granules contained within the channels. Each of the pockets includes a plurality of holes to enable water to pass through the back structure. A filter element is secured to the front of the back structure to cover the pockets. Positioned between the pockets are protruding shelves which engage the filter element. The provision of the pockets and shelves enables a uniform distribution of filtration granules to be maintained throughout the filter cartridge.

17 Claims, 6 Drawing Sheets

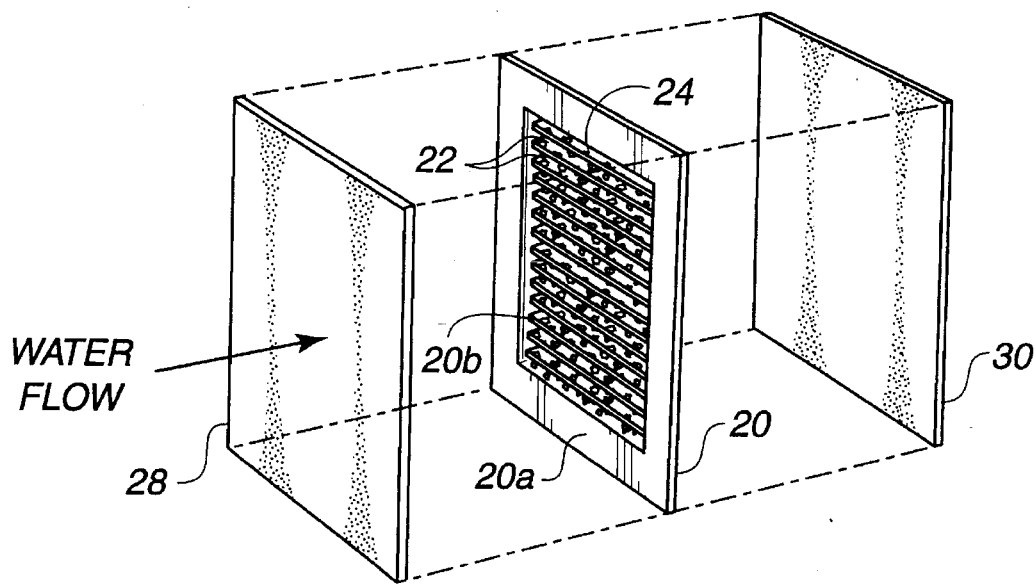
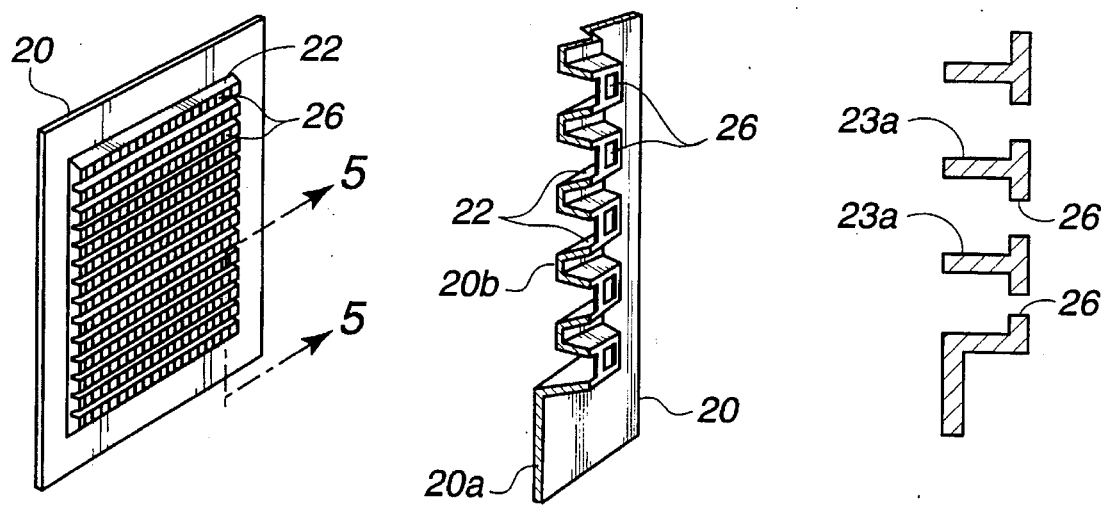
Fig. 1 (Prior Art)
Fig. 2 (Prior Art)
Fig. 3 (Prior Art)
Fig. 4 (Prior Art)

FILTER CARTRIDGE WITH BACK STRUCTURE DEFINING A WEIR

BACKGROUND OF THE INVENTION

1. Field of the Invention

This invention relates to a filter device, and more particularly to a filter cartridge which is used in a liquid or gas filter. Still more particularly, the present invention relates to a filter cartridge which employs granulated material such as activated carbon as a filtering material. Such filters are typically used with aquariums.

2. Description of Related Art

FIG. 1 illustrates one prior filter cartridge design which includes a substantially planar back structure or frame 20 having a peripheral section 20a and a slightly indented central section 20b. A plurality of elongated parallel channels 22 are integrally formed in a back wall 23 of the back frame 20. As best seen in FIG. 3, the back wall 23 has a generally serpentine cross-section to define the channels 22. Alternatively, a back structure may define the channels by a plurality of horizontal shelves 23a as shown in FIG. 4.

Disposed within the channels are filter granules 24 such as activated carbon. Typically, enough granules are employed to substantially fill each of the channels 22 as shown in FIGS. 2–4. Each of the channels 22 includes a plurality of openings 26 which enable water to flow through the back frame 20. The openings 26 are generally smaller than the carbon granules 24 so that the granules cannot pass through them.

The filter granules are typically placed into the channels 22 when the cartridge is oriented horizontally. A sheet-like filter element 28 is then secured to the back frame 20 and serves to retain the carbon granules 24 within the channels 22 in use. Typically, the filter element 28 is secured only at the periphery 20a of the back frame and is attached by means of a heat bonding process. The purpose of the filter element 28 is to filter out large particulate matter from the water passing through it. The granules 24 operate as a chemical filter to chemically treat other pollutants. It is also known to secure a second filter element 30 to the back side of the back frame 20. This element will provide some additional filtration. However, most of the large particulate filtration will be provided by the front filter element 28.

With the filter element 28 in place, it is intended that the granules 24 be retained within their respective channels 22. However, because the material of the filter element 28 is often quite flexible, some of the granules 24 may fall out of their channels, particularly if the filter is subjected to vigorous handling during installation or shipping. If too many granules fall toward the bottom of the filter cartridge, water passing through the upper portion of the cartridge may not receive sufficient chemical filtration, thereby reducing overall filtration efficiency.

After prolonged use, the filter element often comes clogged with debris and the filter cartridge comes relatively heavy and very slippery. As a result, it can be a difficult and unappealing task to remove the filter cartridge from the filter box in order to replace it with a fresh filter cartridge.

In addition, as the filter element becomes clogged with debris, the water level can increase behind the filter cartridge to the point that water overflows the filter box. This can result in partially emptying the aquarium and spilling aquarium water on the floor. Besides the mess, water flow to the aquarium can also be stopped or reduced to a point that adequate aeration of the aquarium water is interrupted which can be harmful and even fatal to the fish in the aquarium.

To provide an indication that the filter cartridge needs replacing or servicing, it is known to provide a clogged filter indicator. Typically, such indicators take the form of an overflow indicator in which the flow of water is diverted in some manner to indicate a clogged filter. However, until the filter is replaced or serviced, the flow of water to the aquarium may remain so impaired as to reduce the aeration of the water in the aquarium to harmful levels.

SUMMARY OF THE INVENTION

It is an object of the present invention to provide an improved filter cartridge obviating, for practical purposes, the above-mentioned limitations, particularly in a manner requiring a relatively uncomplicated mechanical arrangement.

These and other objects are achieved by providing a filter cartridge which includes a substantially planar back structure having a plurality of pockets and protruding shelves formed in it to hold the granules of filter material in a relatively fixed position. The back structure is perforated to allow water to pass through it, and a filter element is secured to the back frame to cover the pockets and protruding shelves to thereby retain the granules. In a preferred embodiment of the invention, the pockets are elongated channels defined by the shelves and a rear wall, which are filled with carbon granules. The leading edges of the shelves are arc-shaped to extend beyond the plane of the back structure to ensure secure engagement with the filter element. As a result uniform distribution of carbon granules is maintained despite the fact that the filter cartridge is operated on one edge.

In another aspect of the present invention, the filter cartridge of the illustrated embodiment has an overflow weir which not only provides an early indication that the filter has become clogged and requires servicing, but also ensures a sufficient flow of water to the aquarium to provide adequate aeration of the aquarium water. In yet another aspect of the invention, the filter cartridge of the illustrated embodiment has a handle which remains above the water line even after the filter becomes clogged. As a result, the cartridge may be readily grasped and removed without the necessity for grasping a submerged portion of the cartridge that may have become slippery due to the growth of algae as well as being wet.

BRIEF DESCRIPTION OF THE DRAWINGS

The invention will now be described with reference to the drawings, in which:

FIG. 1 is an exploded perspective view of a prior art filter cartridge;

FIG. 2 is a rear perspective view of the back frame of the filter cartridge of FIG. 1;

FIG. 3 is a perspective view and section of the back frame of the filter cartridge of FIG. 2;

FIG. 4 is a side cross-sectional view of the back frame of another prior art filter cartridge;

DESCRIPTION OF THE ILLUSTRATED EMBODIMENT

The following description is of the best presently contemplated mode of carrying out the invention. This description is made for the purposes of illustration and is not to be taken in a limiting sense.

Figure 5:
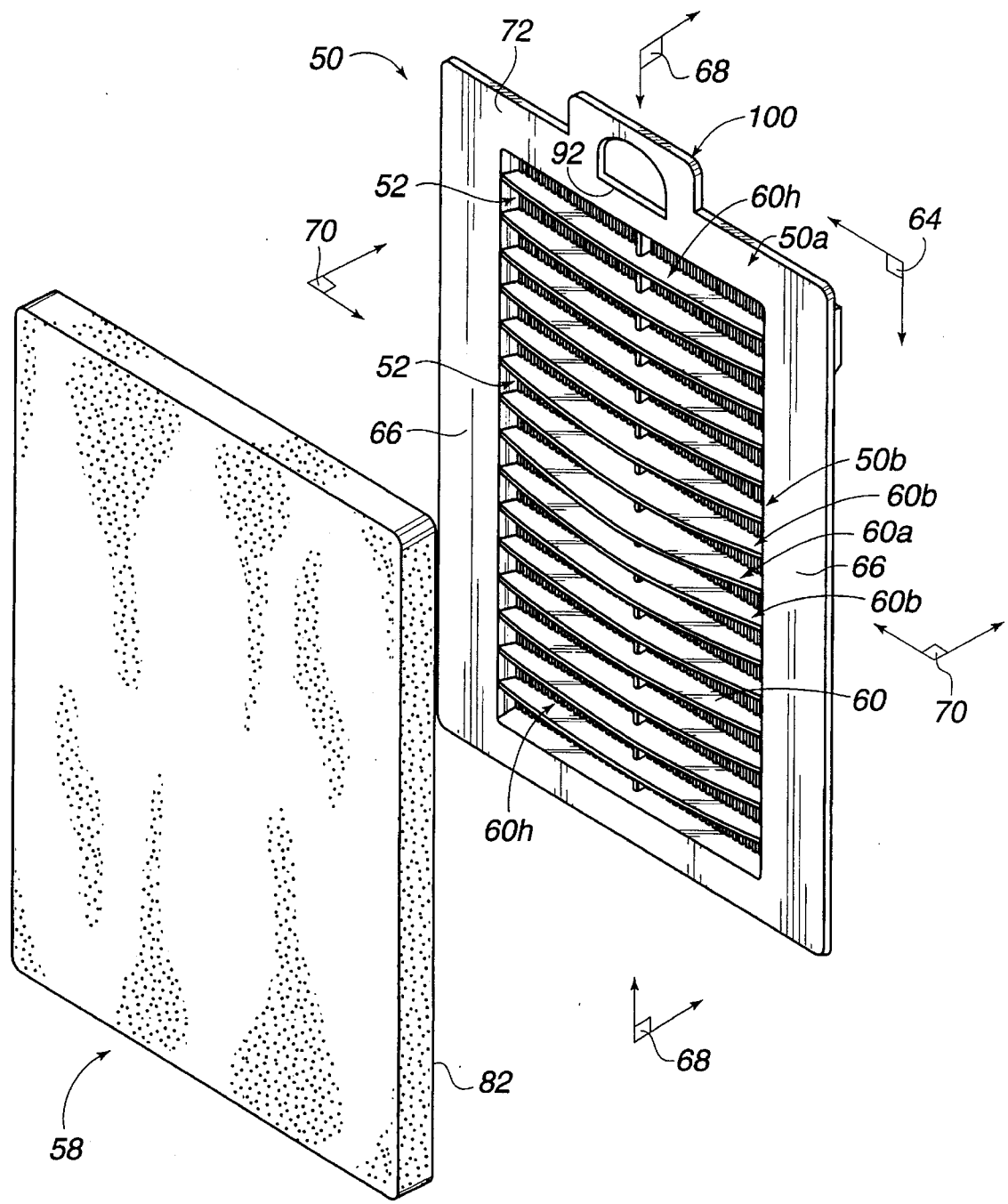
FIG. 5 is an exploded perspective view of a filter cartridge in accordance with a preferred embodiment of the present invention.

Referring to FIG. 5, the present invention includes a back structure or frame 50 which may be formed, for example, of molded styrene or polypropylene. The back frame is a substantially planar element which includes a peripheral flange-shaped section 50a and a protruding central section 50b which, as explained in greater detail below, facilitates maintaining a substantially uniform distribution of filter material in the frame 50.

Figure 6:
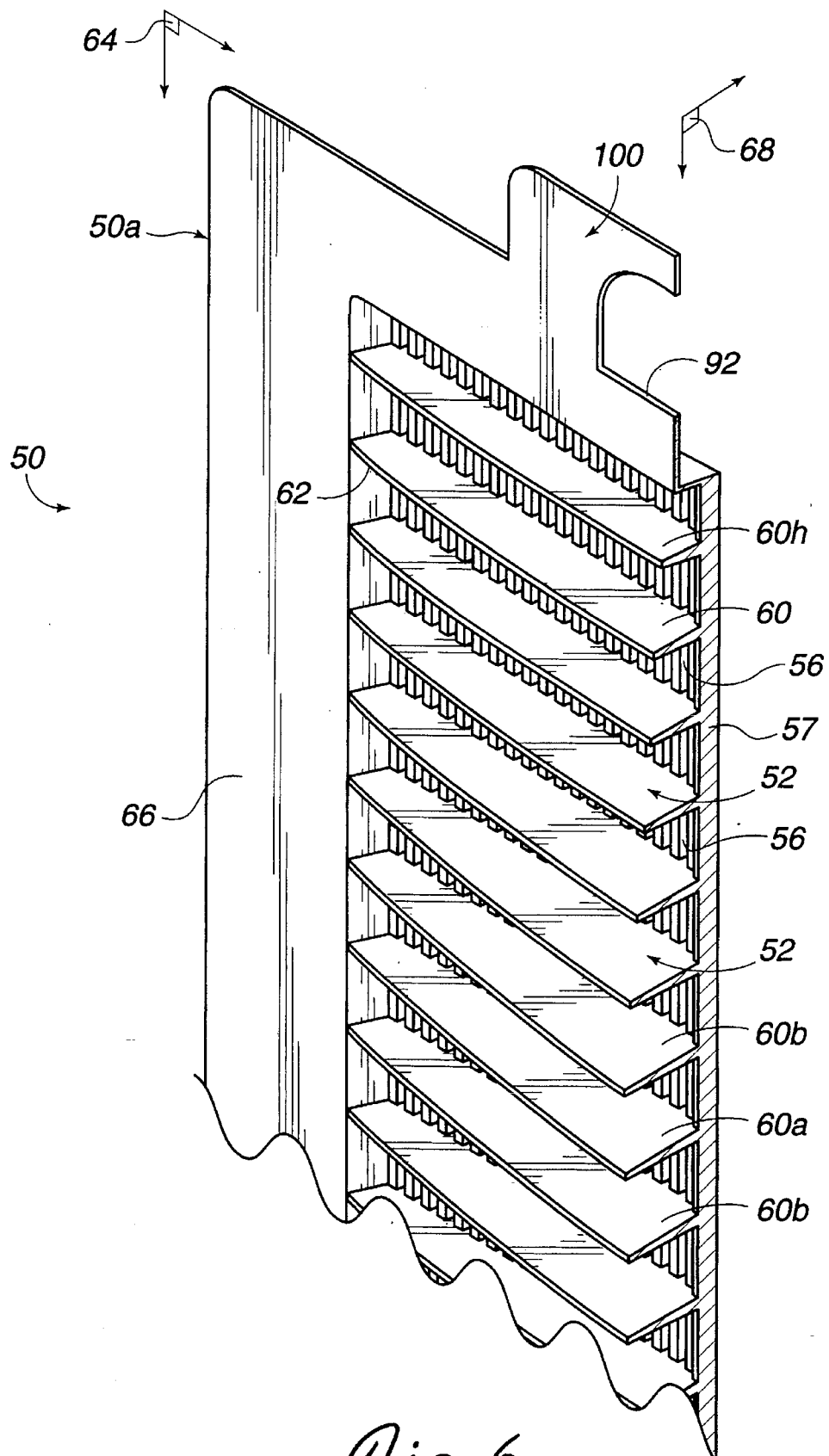
FIG. 6 is a front perspective view and section of the back frame of the filter cartridge of FIG. 5.
Figure 7:
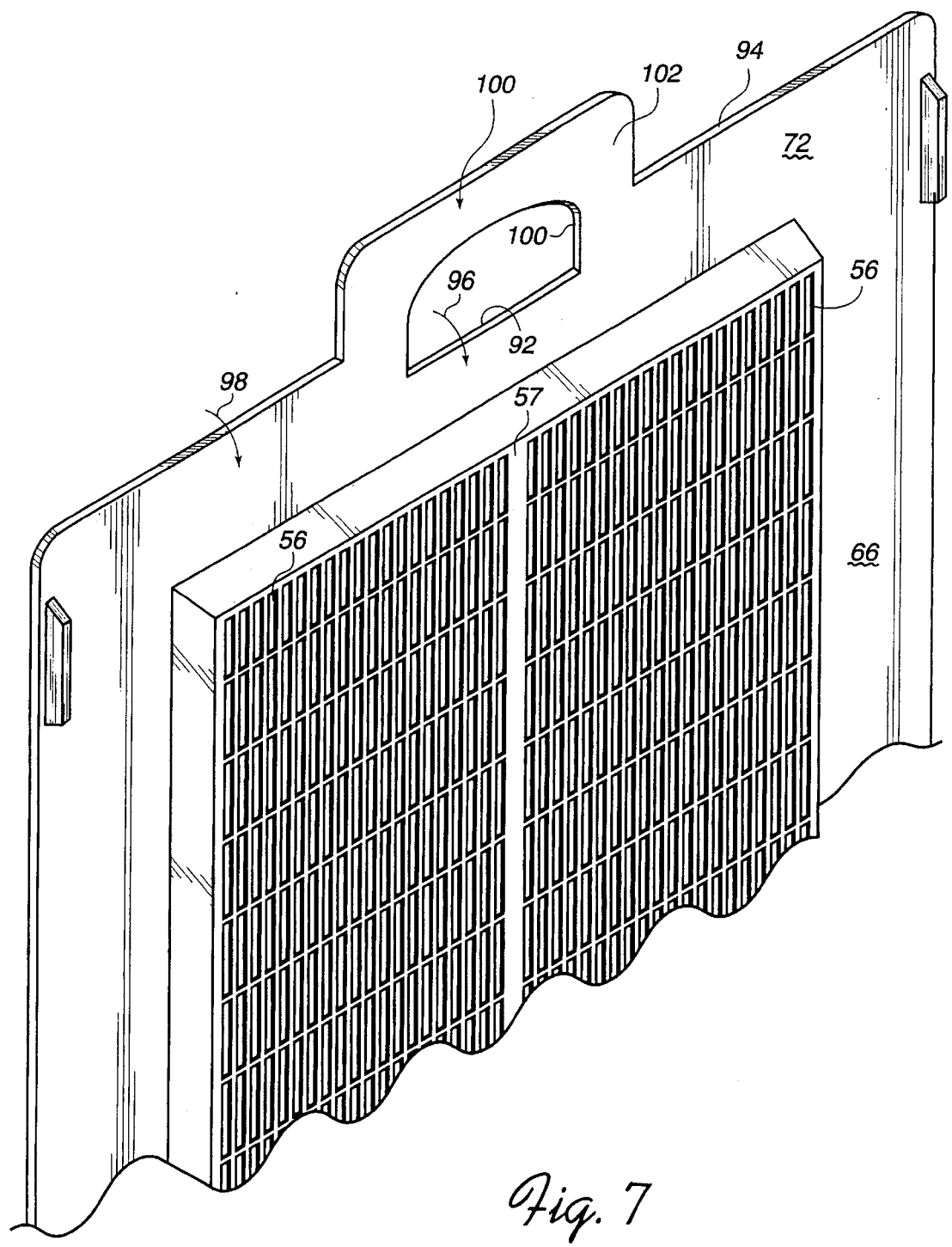
FIG. 7 is a back enlarged perspective view of the back frame of the filter cartridge of FIG. 5.

A plurality of elongated parallel channels 52 are integrally formed in the central portion 50b of the back frame 50. Disposed within the channels 52 are filter granules 54 such as activated carbon. As shown in FIGS. 6 and 7, each of the channels 52 includes a plurality of openings 56 formed in a back wall 57 of the channels 52, which enable water to flow through the back frame 50. The openings 56 are smaller than the carbon granules 54 so that the granules cannot pass through them.

Figure 9:
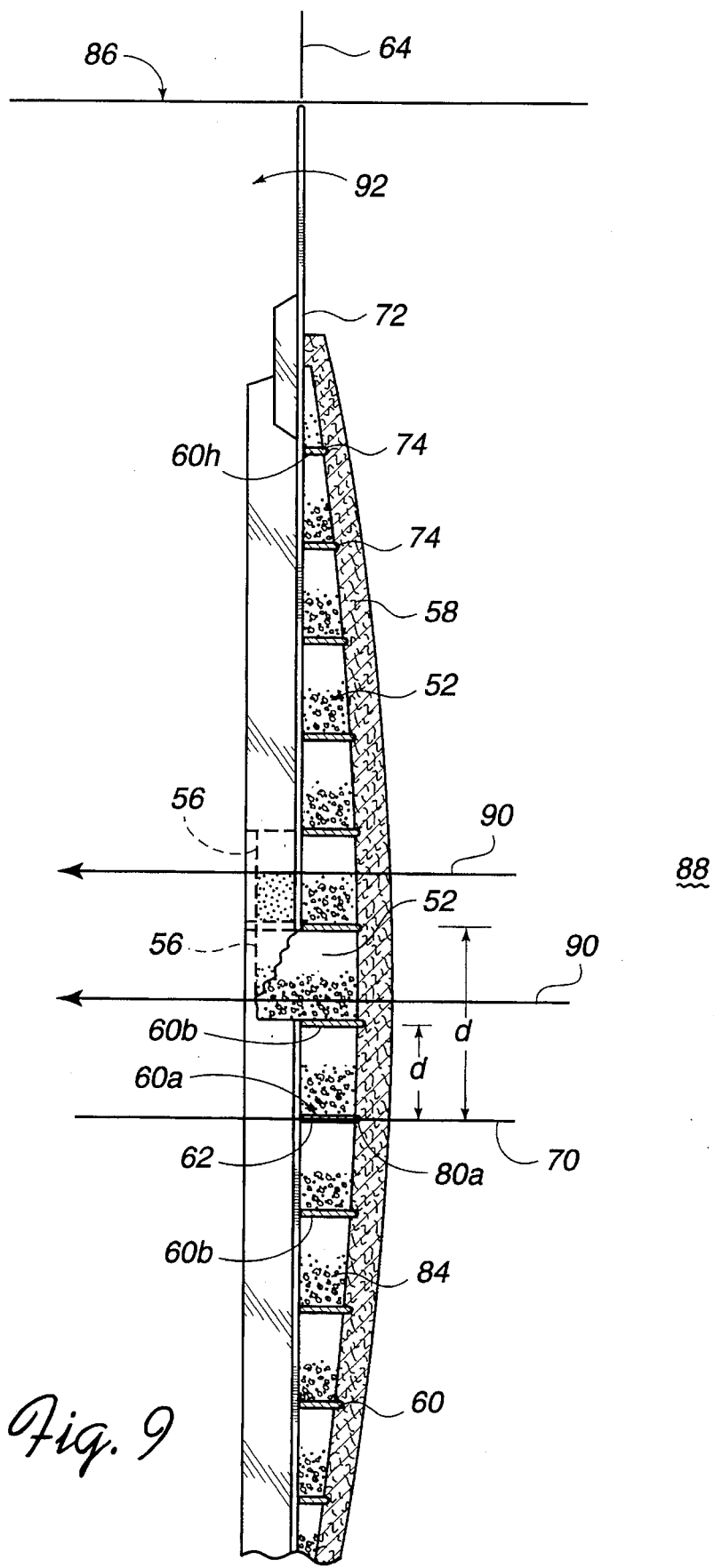
FIG. 9 is a cutaway side view of the filter cartridge of FIG. 5 installed in a filter box.

It is preferred that the amount of filter granules placed in the channels be a function of the orientation of the cartridge when placed in the filter box. For example, if the parallel channels 52 are horizontal (as shown in FIG. 9) when the cartridge is placed in the filter box, it is preferred that the channels be partially filled with filter granules in order for the water to have sufficient flow paths over the granules such that the cartridge does not adversely impede the overall flow rate through the filter box. On the other hand, if the parallel channels are vertical when placed in the filter box, the channels are preferably substantially filled with carbon granules since the granules will tend to fall to the bottom of the channels, thereby permitting the water to flow over the top of the granules.

A sheet-like filter element 58 is secured to the back frame 50 and serves to retain the carbon granules 54 within the channels 52. The filter element 58 is preferably made of a non-woven polyester fibrous material which defines pores between the fibers of the material. Alternatively, the filter element 58 may be made of a reticulated polyether foam, a reticulated non-woven material, or any of a variety of other porous materials including spun polyester, nylon and cotton. In the preferred embodiment of the invention, the filter element 58 is secured only at the peripheral flange 50a of the back frame and is attached by means of a heat bonding process. Of course, other methods of attaching the filter element 58 to the back frame 50 could be employed, and the element could be secured to the front face of the inner section 50b as well as the peripheral flange 50a. The purpose of the filter element 58 is to filter out large particulate matter from the water passing through it. The granules 54 operate as a chemical filter to chemically treat other pollutants.

Figure 8:
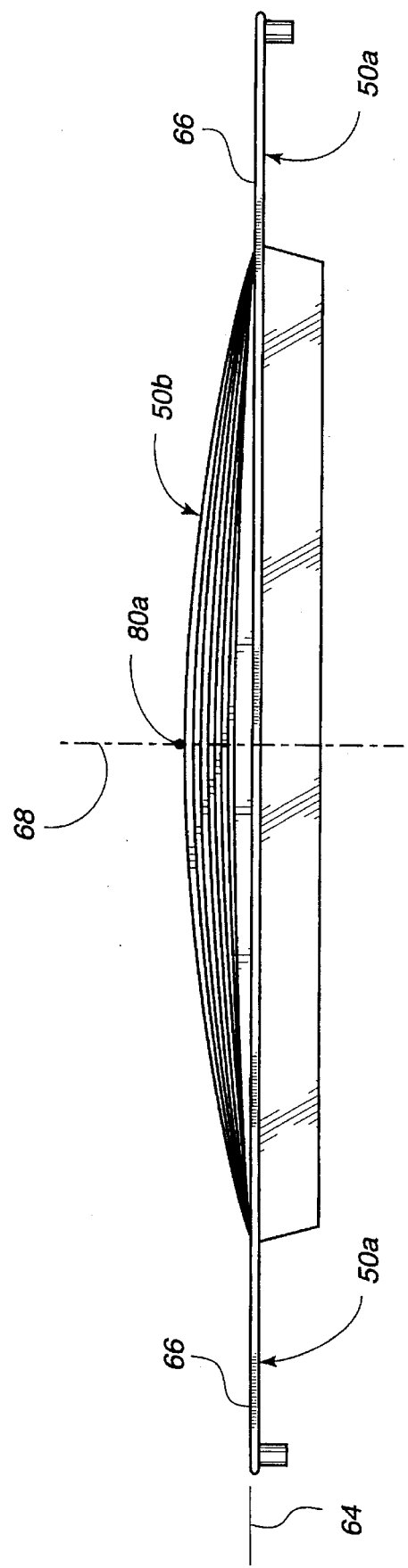
FIG. 8 is a top view of the back frame of the filter cartridge of FIG. 5.

With the filter element 58 in place, the granules 54 are maintained within their respective channels 52. In accordance with one aspect of the invention, the interior horizontal walls of the channels 52 are formed from a plurality of spaced horizontal shelves 60, each shelf 60 having a protruding curved leading edge 62. As best seen in FIGS. 6, 8 and 9, the leading edge 62 of each shelf 60 extends beyond the body plane 64 defined by the peripheral flange 50a to sealingly engage the deformable filter element 58 (FIG. 9).

The polyester material of the filter element 58 is quite flexible and absent the novel curved shape of the central section 50b of the illustrated embodiment, an undesirably large number of the granules 54 may fall out of their initial channels 52 and collect in the bottom channels. To reduce or eliminate this potential uneven redistribution of the granules, the leading edge 62 of each shelf 60 has been curved so that it is generally flush immediately adjacent the vertical portions 66 of the peripheral flange 50a but curves outwardly to a maximum at the vertical center plane 68 of the back frame 50 as shown in FIGS. 6 and 8. The curvature of each shelf 60 is symmetrical about the vertical center plane 68 such that the radii of curvature of the shelves 60 are each centered in the center plane 68.

Furthermore, the maximum extent of the shelves 60 beyond the peripheral flange 50a has been varied. As best seen in FIGS. 6 and 9, in the illustrated embodiment, the center shelf 60a (lying in the horizontal center plane 70 orthogonal to the vertical center plane 68) extends the greatest beyond the peripheral flange 50a. The immediately adjacent shelves 60b on either side of the center shelf 60a also extend from the peripheral flange 50a an amount preferably equal to that of the center shelf 60a. However, the maximum extent of the remaining shelves 60 decreases generally as a function of the distance d of the shelf from the center shelf 60a. As a consequence, the shelves 60h farthest from the center shelf 60a and closest to the vertical portion 72 of the peripheral flange 50a extend the least beyond the peripheral flange 50a. It is readily apparent from FIG. 9 that although some of the immediately adjacent shelves may extend the same or approximately the same amount, the front face 74 of the leading edges 62 of each of the shelves 60 generally describes an arc in each vertical plane such as the vertical cross-sectional plane depicted in FIG. 9.

Similarly, the leading edge 62 of each shelf describes an arc in the orthogonal horizontal planes as shown in FIG. 8. Like the maximum extent of the shelves, the radii of curvature of the leading edges 62 of the shelves have also been varied. As best seen in FIG. 8, the center shelf 60a has the smallest radius of curvature and hence the sharpest curve. The radii of curvature of the remaining shelves 60 increase generally as a function of the distance d (FIG. 9) from the center shelf 60a. Of course, the greater the radius of curvature, the more gradual the curve of the leading edge 62. However, in the illustrated embodiment, the radii of curvature of the shelves 60b nearest the center shelf 60a are preferably the same as the radius of curvature of the center shelf 60a.

Thus, the leading edges 62 of the shelves 60 define a three dimensional surface which is curved in two orthogonal directions with the point of maximum protrusion of the surface (i.e., the "peak" of the surface) indicated at 80a being located at the centers of the leading edges 62a and 62b of the three center shelves 60a and 60b, respectively.

In manufacturing, the carbon granules 54 are simply placed into the channels 52 while the back frame 50 is maintained horizontal. The filter element 58 is then preferably heat bonded at its peripheral edges to the front face of the peripheral flange 50a of the filter frame 50. Because of its elastic quality, the filter element 58 snugly engages the protruding leading edges 62 of each of the shelves 60 with each leading edge 62 slightly deforming the filter element 58 at the areas of engagement as shown in FIG. 9. In this manner, the leading edges 62 of the shelves actually set the contour of the inner surface of the filter element, thus preventing large gaps from appearing between the edges of the shelves and the filter element. Indeed, such an arrangement has been found to provide a good seal between the filter element 58 and the face 74 of the leading edge 62 of each shelf 60 without the need for heat bonding or otherwise attaching the filter element 58 to the faces 74 of the shelf leading edges 62. As a consequence, the number of granules which move from one channel to another is relatively small, even after relatively rough handling and shaking. As a result, the overall distribution of granules across the surface of the back frame 50 is maintained very uniform. It should be appreciated, of course, that the shape of the surface defined by the front faces 74 of the protruding shelf leading edges may be varied depending upon the shape and elastic qualities of the filter element 58, so long as a good seal is maintained between the front faces 74 and the filter element 58.

Referring to FIG. 9, an assembled cartridge 84 is shown with a typical aquarium filter box 86. The cartridge 84 is operated on its edge. Preferably the cartridge is inserted so that the channels 52 run in a horizontal direction. However, if the channels 52 are substantially full with granules, the cartridge can be placed in the filter with the channels 52 being vertical and the uniform distribution of granules will still be maintained. Substantially good uniform distribution can be further assured independent of cartridge orientation by providing vertical partitions between the horizontal shelves wherein the vertical partition have protruding leading edges to engage the filter element in a manner similar to the protruding leading edges 62 of the horizontal shelves 60.

In operation, a pump (not shown) pumps water into the filter box 86 on the upstream side 88 of the cartridge 84. As represented by the flow arrows 90, the water under pressure flows through the porous filter element 58 and past the porous carbon granules 54 between the shelves 60 of the channels 52 and is filtered by the filter element 58 and the carbon granules 54 as a result. The filtered water exits the cartridge 84 through the openings 56 provided in the rear of the filter frame 50.

After extended use, the filter element 58 will tend to become clogged with debris filtered from the water passing through it. As a consequence, the capacity of the filter element 58 to allow water to pass through it will decline, thereby reducing its effectiveness. As the filter element 58 becomes more clogged, the water level on the upstream side 88 of the filter box 86 will rise. In accordance with another aspect of the invention, an overflow weir 92 has been provided in the upper horizontal flange portion 72 of the peripheral flange 50a. As best seen in FIG. 7, the overflow weir 92 is located lower than the top edge 94 of the upper horizontal flange portion 72 of the peripheral flange 50a. As a consequence, water will pass through the overflow weir 92 as represented by the flow arrow 96 before water will flow over the top edge 94 of the peripheral flange 50a as represented by the flow arrow 98. In this manner, the overflow weir 92 provides an early indication that the filter cartridge 84 has become clogged and requires servicing or replacing.

Besides providing an early indication that the filter cartridge has become clogged, the weir 92 is designed to permit sufficient water to flow through the weir to ensure aeration of aquarium water by providing an adequate flow of water even after the cartridge becomes clogged. In the illustrated embodiment, the weir 92 is set a prescribed distance above the uppermost openings 56 of the back frame 50. This distance is determined to ensure that water begins to flow through the weir 92 once the cartridge has clogged to an extent such that the flow of water through the cartridge openings 56 has been reduced to or approaching the minimum necessary to provide adequate aeration of the aquarium water. Thus, if the cartridge is not immediately serviced or replaced once this minimum has been reached, any further clogging of the cartridge leading to still further reduced water flow through the openings 56 of the cartridge, will cause the water level to rise further and the flow of water through the weir 92 to increase. In this manner, reduced flow through the cartridge openings 56 is compensated by increased flow through the weir 92. The length of the weir 92 is designed such that if the cartridge becomes totally clogged, the water flow through the weir 92 alone is sufficient to provide adequate aeration of the aquarium water. It will be appreciated by those skilled in the art that the length of the weir and the spacing between the weir and the uppermost cartridge openings 56 are functions of the particular water flow rate, filter box size and the pump pressure capability of each application and may be determined empirically.

In yet another aspect of the present invention, the overflow weir 92 is formed from an opening 100 in an extended tab 102 of the peripheral flange 50a. As a result, a convenient handle 100 is also formed above the overflow weir 92. Because the handle 100 is spaced substantially higher than the level of the overflow weir 92, the handle 100 will not be submerged when the water begins to flow through the overflow weir 92. Thus, the handle will stay relatively dry and free of algae growth facilitating grasping the handle 100 for removal of the cartridge 84 even after the cartridge has become clogged and water is overflowing the weir 92.

It is seen from the above that the present invention provides an improved filter cartridge which maintains a relatively uniform distribution of filter granules within the cartridge. The cartridge has shelves which protrude from the back frame of the cartridge to securely engage the filter element attached to the front of the cartridge. Furthermore, each shelf is shaped and sized to ensure secure sealing between the shelf and the filter element along the entire length of the leading edge of each shelf.

It will of course, be understood that modifications of the present invention, in its various aspects, will be apparent to those skilled in the art, some being apparent only after study and others being matters of routine design. For example, although the filter element 58 has been illustrated as being bonded to the back frame 50, it is understood that a second frame may be used to secure the filter element to the back frame. Furthermore, although the shelves 60 have been shown extending to the rear of the back frame to form parallel, horizontal channels for the filter granules, it should be appreciated that pockets of various sizes and shapes may be formed in the back frame between protruding shelves to receive the granules. Other embodiments are also possible, their specific designs depending upon the particular application. As such, the scope of the invention should not be limited by the particular embodiments herein described but should be defined only by the appended claims and equivalents thereof.

What is claimed is:

1. A filter device for use in a filter box, comprising:

a substantially planar back structure having a plurality of integrally formed shelves, each shelf having a curved protruding edge extending on a first side of the structure, said structure further having a plurality of integrally formed pockets extending to the other side thereof, each pocket having one or more openings to enable fluid to flow through the back structure;

a plurality of granules of filter material disposed on the shelves and in the pockets, wherein the granules are generally larger than the openings; and a porous filter element secured to the first side of the back structure, said filter element sealingly engaging the edges of the shelves and retaining the granules of filter material between the filter element and the shelves and pockets of the back structure, said filter device enabling a substantially uniform distribution of filter material granules to be maintained across the surface of the back structure.

2. A filter device according to claim 1 wherein each shelf edge has a radius of curvature which defines the curvature of the shelf edge.

3. A filter device according to claim 2 wherein the shelves are parallel and horizontal.

4. A filter device according to claim 3 wherein the back structure has a vertically measured center and the radius of curvature associated with each shelf is least for the shelf closest to the vertically measured center of the back structure and generally progressively increases for each shelf as the vertical distance of the shelf from the center increases.

5. A filter device according to claim 4 wherein the shelves immediately adjacent to the center shelf have the same radius of curvature as the center shelf.

6. A filter device according to claim 4 wherein the maximum distance each shelf edge extends to the first side is greatest for the shelf closest to the vertically measured center of the back structure and generally progressively decreases for each shelf as the vertical distance of the shelf from the center increases.

7. A filter device according to claim 6 wherein the distance the shelves immediately adjacent to center shelf extend is the same distance that the center shelf extends.

8. A filter device according to claim 1, wherein the pockets are comprised of a plurality of parallel elongated channels, each having a plurality of openings therein.

9. A filter device according to claim 8, wherein the filter element is polyester.

10. A filter device according to claim 9, wherein the filter device has a peripheral flange and the filter element is secured to the peripheral flange of the back structure.

11. A filter device according to claim 10, wherein the back structure is plastic.

12. A filter device according to claim 11, wherein the filter element is secured to the back structure by means of heat bonding.

13. A filter device according to claim 1, wherein the filter material is carbon.

14. A filter device for use in a filter box, comprising:

a substantially planar back structure having a plurality of integrally formed shelves, each shelf having a protruding edge extending on a first side of the structure, said structure further having a plurality of integrally formed pockets extending to the other side thereof, each pocket having one or more openings to enable fluid to flow through the back structure;

a plurality of granules of filter material disposed on the shelves and in the pockets, wherein the granules are generally larger than the openings; and a porous filter element secured to the first side of the back structure, said filter element sealingly engaging the edges of the shelves and retaining the granules of filter material between the filter element and the shelves and pockets of the back structure, said filter device enabling a substantially uniform distribution of filter material granules to be maintained across the surface of the back structure, wherein the back structure defines an overflow weir at the top of the back structure to indicate by the passage of water over the weir that the filter is at least partially clogged, wherein the overflow weir has a predetermined size and position so that the combined flow of water through the device and over the weir remains above a predetermined minimum as the filter becomes progressively clogged, and wherein the weir is formed by an opening in the back structure which defines a handle above the weir by which the device may be manually grasped and removed from the filter box.

15. A filter device comprising:

a substantially planar plastic back structure defining a body plane, a vertical center plane and a horizontal center plane;

a number more than three of parallel and horizontal shelves integrally formed on the back structure, each shelf having a curved leading edge extending beyond the body plane of the back structure on a first side of the back structure wherein the curvature of each curved edge is defined by a radius of curvature which is centered on the vertical center plane and is least for the three shelves closest to the horizontal center plane of the back structure and generally progressively increases for each shelf as the vertical distance of the shelf from the horizontal center plane increases and wherein the maximum distance each shelf edge extends to the first side is greatest for the three shelves closest to the horizontal center plane of the back structure and generally progressively decreases for each shelf as the vertical distance of the shelf from the horizontal center plane increases;

a rear wall integrally formed with the rear of the shelves to define a plurality of elongated parallel horizontal channels on a rear side of the back structure, said rear wall having a plurality of openings associated with each channel to enable fluid to pass through the back structure;

a plurality of granules of filter material disposed on the shelves and in the channels in a substantially uniform distribution wherein the openings in the channels are configured to prevent the passage of granules therethrough; and a porous filter element secured to the back structure to cover the first side of the back structure and retain the granules between the filter element and back structure, said channels and shelves serving to maintain a substantially uniform distribution of granules within the filter device.

16. A filter device according to claim 15, wherein each channel is substantially filled with granules, whereby a uniform distribution of granules will be maintained across the surface of the back structure regardless of the orientation of the filter device.

17. A method of forming a filter device comprising:

placing a plurality of carbon granules into a substantially planar plastic back structure defining a body plane, a vertical center plane and a horizontal center plane, said structure having a plurality of parallel and horizontal shelves integrally formed on the back structure, each shelf having a curved leading edge extending beyond the body plane of the back structure on a first side of the back structure wherein the curvature of each curved edge is defined by a radius of curvature which is centered on the vertical center plane and is least for the shelf closest to the horizontal center plane of the back structure and generally progressively increases for each shelf as the vertical distance of the shelf from the horizontal center plane increases and wherein the maximum distance each shelf edge extends to the first side is greatest for the shelf closest to the horizontal center plane of the back structure and generally progressively decreases for each shelf as the vertical distance of the shelf from the vertical center plane increases, said structure further having a rear wall integrally formed with the rear of the shelves to define a plurality of elongated parallel horizontal channels on a rear side of the back structure, said rear wall having a plurality of openings associated with each channel to enable fluid to pass through the back structure, wherein the plurality of carbon granules are disposed on the shelves and in the channels in a substantially uniform distribution and wherein the openings in the channels are configured to prevent the passage of granules therethrough; and heat bonding a porous filter element to the first side of the back structure so that the filter element engages the shelves and covers the channels to retain the granules between the filter element and back structure, said shelves and channels serving to maintain a substantially uniform distribution of granules within the filter device.

\* \* \* \* \*